United States Patent [19]

Bessinger

[11] Patent Number: 4,581,799
[45] Date of Patent: Apr. 15, 1986

[54] METHOD OF ASSEMBLING A BALL BEARING

[75] Inventor: Walter L. Bessinger, Grand Haven, Mich.

[73] Assignee: Knape & Vogt Manufacturing Company, Grand Rapids, Mich.

[21] Appl. No.: 633,582

[22] Filed: Jul. 23, 1984

[51] Int. Cl.⁴ .................. B21D 39/00; B21D 53/10; F16C 33/58
[52] U.S. Cl. .................. 29/148.4 R; 29/437; 29/512; 29/523; 308/3.8; 384/449; 384/488; 384/511
[58] Field of Search ............ 384/449, 488, 506, 511, 384/492; 308/3.8, 6 R; 312/341 P; 29/148.4 R, 148.4 A, 148.4 B, 148.4 C, 437, 512, 523

[56] References Cited

U.S. PATENT DOCUMENTS

| | | | |
|---|---|---|---|
| 2,805,107 | 9/1957 | Van De Warker et al. | 384/499 |
| 3,469,892 | 9/1969 | Langstroth | 308/3.8 |
| 3,625,575 | 12/1971 | Darnell | 308/6 R X |
| 4,243,277 | 1/1981 | Fortuna | 308/3.8 X |

Primary Examiner—Stuart S. Levy
Assistant Examiner—Lynn M. Sohacki
Attorney, Agent, or Firm—Price, Heneveld, Huizenga & Cooper

[57] ABSTRACT

The specification discloses a self-contained ball bearing for use in drawer rails. The bearing includes balls axially retained between a flared end of an inner race member and a washer retained on a stem of the inner race member. The bearing further includes a polymeric outer race member having a thrust shoulder extending radially inwardly closely proximate the flared end of the inner race member to form a dirt shield therewith and to provide an improved thrust bearing surface.

1 Claim, 2 Drawing Figures

4,581,799

METHOD OF ASSEMBLING A BALL BEARING

BACKGROUND OF THE INVENTION

The present invention relates to ball bearings, and more particularly to ball bearings suitable for high-speed fabrication and assembly and particularly advantageous for use in drawer slides.

Manufacture and assembly of ball bearings typically involves several components and several machining operations. Manufacture of ball bearings for use in inexpensive drawer slides normally necessitates a design decision of whether to sacrifice quality to hold cost down, or alternatively achieve quality at a relatively high price.

One ball bearing structure for use in drawer slides optimizing the balance between cost and quality is illustrated in U.S. Pat. No. 4,243,277, issued Jan. 6, 1981, to Fortuna, and entitled BALL BEARING. This bearing includes a hollow stem having a body defining an inner race, a retention washer mounted on the stem and held in position by swaging the stem, a plurality of balls axially retained between the washer and stem body, and a polymeric outer race member defining an outer race. The outer race member includes three axial diametrical portions with the middle portion being the largest in diameter defining the ball race. Although this structure constituted a noteworthy advance over the prior art, it has subsequently been noted that the bearing suffers two minor drawbacks. First, the ball race is open at both of its opposite sides between the inner race and outer race, permitting dirt and other debris to enter the raceway and foul the bearing. This detracts from the smooth operation of the bearing and also reduces the bearing life. Second, the outer race which is snap-fitted over the balls is capable of bearing only relatively small lateral thrust forces.

SUMMARY OF THE INVENTION

The aforementioned problems are overcome in the present invention. Essentially, a ball bearing is provided which can be relatively inexpensively manufactured and yet provides a high-quality feel and smooth operation. The bearing includes a dirt shield to prevent the ingress of dirt and other debris to the ball raceway. Additionally, the outer race member includes an improved thrust bearing surfce to further enhance the quality feel of the bearing.

More particularly, the ball bearing includes an inner race assembly including a hollow inner race member, a washer swaged onto the inner race member to together define an inner race, a plurality of balls positioned within the inner race, and a polymeric outer race member defining an outer race fitted over the balls. The inner race member includes a curvilinear body flaring radially outwardly, and the outer race includes a lateral thrust bearing shoulder extending inwardly to a point closely proximate the flared body of the inner race member. Consequently, the thrust bearing shoulder and the inner race body cooperate to form a dirt shield greatly reducing the contamination of the ball raceway. Further, the thrust bearing shoulder extends inwardly to a point closely proximate the midpoint of the balls to provide an improved lateral thrust bearing surface.

These and other objects, advantages, and features of the invention will be more readily understood and appreciated by reference to the detailed description of the preferred embodiment and the drawings.

DETAILED DESCRIPTION OF THE PREFERRED EMBODIMENT

Figure 1:
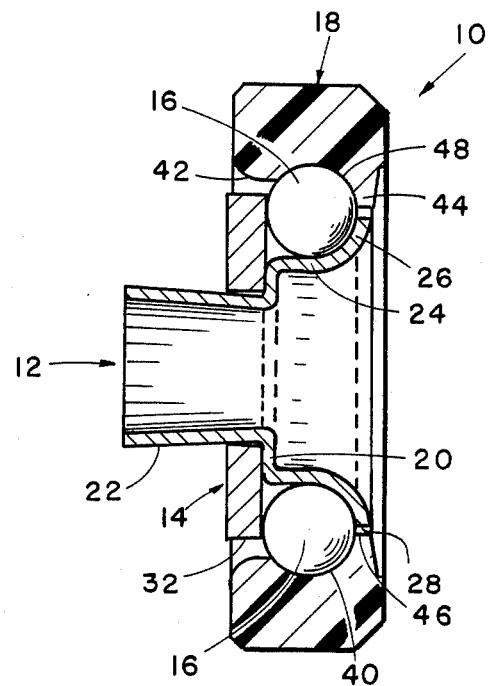
FIG. 1 is a sectional view of the present ball bearing.

A ball bearing constructed in accordance with the preferred embodiment of the invention is illustrated in the drawings and generally designated 10. The bearing includes inner race member 12, thrust washer 14, balls 16, and outer race member 18. Thrust washer 14 is swaged onto inner race member 12 to together define an inner ball race; and outer race member 18 defines the outer ball race. Inner and outer race members 12 and 18 therefore define a ball raceway in which balls 16 are positioned.

Inner race member 12 is a one-piece, stamped member, including shoulder 20, generally cylindrical stem 22 extending in a first direction from the shoulder, and flared body portion 24 extending in an opposite direction from the shoulder. Body 24 includes a curvilinear portion 26 which flares radially outwardly and terminates in peripheral edge 28.

Thrust washer 14 includes central aperture 30 having an internal diameter generally identical to the external diameter of inner race stem 22 prior to swaging. Washer 14 is retained in position abutting shoulder 20 by swaging stem 22 (see FIG. 1). In the preferred embodiment, stem 22 is swaged sufficiently so that washer 14 can withstand a minimum of a twenty-five pound-push-off force. The outer diameter 32 of washer 14 is slightly larger than the diameter of peripheral edge 28 of the inner race member.

Balls 16 are positioned between inner race member 12, thrust washer 14, and outer race member 18 within the ball raceway. A full complement of ten balls 16 is included; and no ball retainer is used. As seen in FIG. 1, peripheral edge 28 of inner race member 12 extends outwardly to a point closely proximate the midpoint of balls 16. The outer diameter 32 of thrust washer 14 extends radially outwardly slightly beyond the midpoint of balls 16.

Outer race member 18 is a polymeric annular member, preferably nylon, molded to have three axially spaced internal diameter portions. The central diameter portion 40 is a concave curvilinear surface defining the outer ball race and is the portion of largest diameter. On a first side of central portion 40 is second axial portion or snap rib 42, which is a curvilinear surface convex inwardly which blends into inner race 40. On the other side of outer race 40 is third axial portion or shoulder 44 which extends radially inwardly to terminate in internal edge 46. Shoulder 44 extends to a position closely proximate peripheral edge 28 of inner member 12, which is also closely proximate the midpoint of balls 16. In the preferred bearing, wherein the diameter of outer race 18 is about 0.9 inch, the clearance between edges 28 and 46 is about 0.012 to 0.023 inch. Shoulder 44 provides curvilinear thrust bearing surface 48 which blends into inner race 40. Opposite thrust bearing surface 48 is beveled surface 50 which tapers from internal edge 46 to bearing side 52 to decrease the area presented by side 52 for lateral engagement with the drawer rail. Chamfers 54 and 56 are provided at both peripheral edges of outer race member 18 to aid in positioning the outer race member within automated assembly machinery.

ASSEMBLY AND OPERATION

Figure 2:
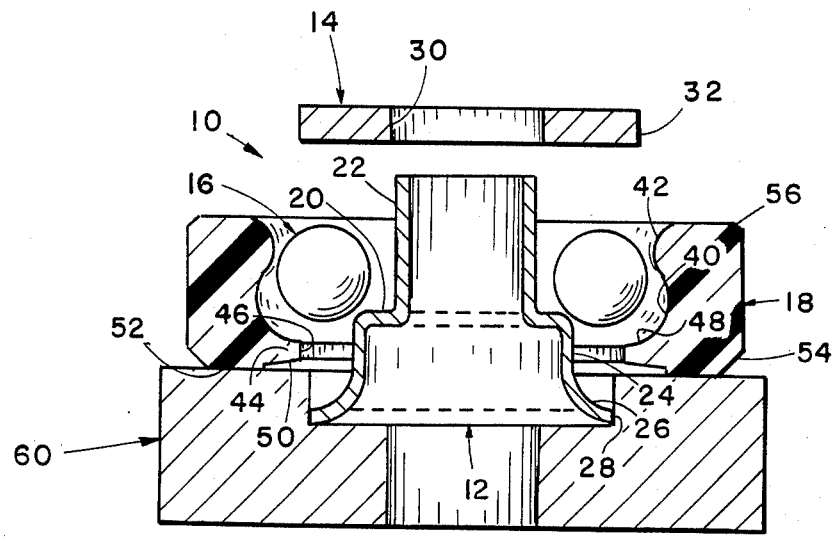
FIG. 2 is a sectional exploded view of the ball bearing.

Ball bearing 10 is assembled by placing inner race member 12 with body portion 24 positioned downwardly in a nest 60. Outer race 18 is concentrically positioned about and slightly above inner race 12 (see FIG. 2). A full complement of ten balls 16 are loaded into the ball raceway between the inner and outer races. The distance between shoulder 20 and snap-rib 42 when the elements are positioned as illustrated in FIG. 2 is slightly greater than the diameter of balls 16. Consequently, balls 16 load easily into the ball raceway. Thrust washer 14 is slid over stem 22 of inner race 12; and the inner race is raised into proper axial orientation with respect to the outer race 18. As the inner race is raised, thrust washer 14 slides into abutment with shoulder 20; and stem 22 is swaged to retain washer 14 in position.

In operation, this relatively inexpensive bearing provides the high-quality feel of more expensive bearings. In particular, the thrust bearing shoulder 44 provides an increased thrust bearing surface for outer race member 18 to provide a tighter feel to bearing 10. As noted above, shoulder 44 extends to a point closely proximate the midpoints of balls 16 so that the thrust surface 48 extends from the top of the ball to approximately the ball midpoint. Additionally, the thrust shoulder 44 and flared body 24 cooperate to form a dirt shield greatly reducing the ingress of dirt and other contaminants to the ball raceway. The close cooperation of peripheral edges 28 and 46 keeps the raceway relatively clean further insuring the smooth feel and long life of the ball bearing.

The above description is that of a preferred embodiment of the invention. Various changes and alterations can be made without departing from the spirit and broader aspects of the invention as set forth in the appended claims, which are to be interpreted in accordance with the principles of patent law, including the doctrine of equivalents.

The embodiments of the invention in which an exclusive property or privilege is claimed are defined as follows:

1. A method of assembling an improved ball bearing comprising:

vertically orienting an inner race having a hollow stem, a shoulder at one end of the stem, and a body flaring radially outwardly from the shoulder to form an inner ball raceway, the body facing downwardly;

concentrically orienting an outer race about the inner race in an assembly position, the outer race including a middle diametrical portion defining an outer ball raceway, and inner and outer diametrical portions on opposite sides of the middle portion, the inner and outer portions being positioned above the inner race shoulder and the inner race body peripheral edge respectively in the assembly position, the distance between the inner portion and the shoulder in the assembly position being larger than the balls to be inserted into the bearing, the distance between the outer portion and the body in the assembly position being smaller than the balls;

dropping balls between the shoulder and the inner portion into the outer ball raceway;

vertically shifting at least one of the outer race and inner race to an operative position with respect to the other, wherein the outer portion is radially aligned with the peripheral edge of the inner race body peripheral edge, the distance between the inner portion and the shoulder in the operative position being less than the diameter of the balls to retain the balls in position;

positioning a washer about the stem and adjacent the shoulder; and swaging the stem to retain the washer in position adjacent the shoulder.

* * * * *